(12) United States Patent
Krishnan et al.

(10) Patent No.: US 10,427,488 B2
(45) Date of Patent: Oct. 1, 2019

(54) METHOD AND APPARATUS FOR MITIGATING STATIC LOADS IN COMPONENTS CONNECTING MULTIPLE STRUCTURES

(71) Applicant: ClearMotion, Inc., Woburn, MA (US)

(72) Inventors: Ramkumar Krishnan, Watertown, MA (US); Marco Giovanardi, Melrose, MA (US)

(73) Assignee: ClearMotion, Inc., Billerica, MA (US)

(*) Notice: Subject to any disclaimer, the term of this patent is extended or adjusted under 35 U.S.C. 154(b) by 49 days.

(21) Appl. No.: 15/782,150

(22) Filed: Oct. 12, 2017

(65) Prior Publication Data

US 2018/0105010 A1 Apr. 19, 2018

Related U.S. Application Data

(60) Provisional application No. 62/407,742, filed on Oct. 13, 2016.

(51) Int. Cl.
*B60G 17/056* (2006.01)
*B60G 17/08* (2006.01)
*B60G 13/00* (2006.01)
*F16F 9/54* (2006.01)

(52) U.S. Cl.
CPC ......... *B60G 17/056* (2013.01); *B60G 13/003* (2013.01); *B60G 17/08* (2013.01); *F16F 9/54* (2013.01); *B60G 2202/413* (2013.01); *B60G 2204/128* (2013.01); *B60G 2600/182* (2013.01)

(58) Field of Classification Search
CPC .... B60G 17/056; B60G 13/003; B60G 17/08; B60G 2204/128; B60G 2202/413; B60G 2600/182; F16F 9/54
See application file for complete search history.

(56) References Cited

U.S. PATENT DOCUMENTS

| | | | | |
|---|---|---|---|---|
| 5,775,720 A * | 7/1998 | Kmiec | ................. | B60G 15/067 188/322.15 |
| 8,333,269 B2 * | 12/2012 | Dickson | ............... | B60G 13/003 188/321.11 |
| 8,668,213 B2 * | 3/2014 | Takagi | ................. | B60G 15/067 280/124.145 |
| 9,302,561 B2 * | 4/2016 | Itou | ...................... | B60G 13/003 |
| 9,452,651 B2 * | 9/2016 | Toyota | ................... | B60G 15/08 |
| 2003/0006574 A1 * | 1/2003 | Momose | ............. | B60G 15/063 280/124.155 |
| 2005/0012256 A1 * | 1/2005 | Huprikar | ............... | B60G 13/003 267/141 |
| 2005/0155829 A1 * | 7/2005 | Germano | ............. | B60G 13/003 188/321.11 |

(Continued)

FOREIGN PATENT DOCUMENTS

EP 2 750 906 B1 4/2017

*Primary Examiner* — Drew J Brown
(74) *Attorney, Agent, or Firm* — Wolf, Greenfield & Sacks, P.C.

(57) ABSTRACT

An apparatus and method are described where one or more pre-stressed spring elements are disposed between two structures to mitigate or cancel the effect of static loads applied to an component connecting the structures. The apparatus and methods may be used, for example, to reduce the adverse impact of static loads on the performance of top-mounts in a suspension system of a vehicle.

19 Claims, 18 Drawing Sheets

(56) References Cited

U.S. PATENT DOCUMENTS

| | | | |
|---|---|---|---|
| 2006/0151928 A1* | 7/2006 | Tamura | B60G 13/003 267/219 |
| 2008/0179148 A1* | 7/2008 | Quinn | B60G 17/06 188/322.13 |
| 2012/0161414 A1* | 6/2012 | Scolaro | B60G 15/068 280/124.155 |
| 2012/0193852 A1* | 8/2012 | Thye-Moormann | B60G 13/003 267/292 |
| 2014/0306419 A1* | 10/2014 | McMullen | B60G 15/067 280/124.155 |
| 2015/0108321 A1* | 4/2015 | Willems | F16F 9/54 248/560 |
| 2016/0097406 A1* | 4/2016 | Zuckerman | B60G 17/056 91/418 |
| 2016/0146253 A1* | 5/2016 | Weiss, II | F16F 9/54 188/321.11 |
| 2018/0009283 A1* | 1/2018 | Pniewski | B60G 15/12 |

* cited by examiner

METHOD AND APPARATUS FOR
MITIGATING STATIC LOADS IN
COMPONENTS CONNECTING MULTIPLE
STRUCTURES

CROSS REFERENCE TO RELATED APPLICATIONS

This application claims the benefit of U.S. Provisional Patent Application Ser. No. 62/407,742, filed Oct. 13, 2016, entitled "Method and Apparatus for Compensating Static Load on a Suspension-Top Mount," by Krishnan, et al. which is incorporated herein by reference in its entirety.

FIELD

Embodiments described herein are related to methods and apparatuses for compensating static load on a suspension top-mount.

BACKGROUND

Top-mounts are used to mitigate road induced motion to improve occupant comfort in a vehicle. Top-mounts typically incorporate elastomeric spring elements that are also able to damp disturbances that may originate, for example, from vertical wheel motion and other wheel events and/or road events. Road events may include, for example, travelling over a pothole, a bump or crack in the road, and/or other road imperfections as well as events such as navigating a turn, braking, and/or accelerating.

SUMMARY

In active suspension systems, under static conditions one or more components of a top-mount assembly may be subject to significant static force, thereby precluding optimal performance of the top-mount assembly. The present disclosure describes, inter glia, various apparatuses and methods that may be used to prevent and/or at least partially counter-balance a static force that is applied to one or more components of a top-mount assembly of a vehicle.

In one aspect, a top-mount assembly for attaching a suspension component to a vehicle body is disclosed. In certain embodiments, the top-mount assembly may include: a strike plate configured to attach to a rod of the suspension component; a first set of one or more first spring elements in contact with the strike plate, wherein each first spring element applies a first force to the strike plate in a first direction; a second set of one or more second spring elements in contact with the strike plate, wherein each second spring element applies a second force to the strike plate in a second direction that is opposite the first direction. In certain embodiments, the second set of one or more spring elements applies a combined force onto the strike plate of at least 200 N, at least 400 N, at least 600 N, at least 800 N, or at least 1000 N. In certain embodiments, the first direction is substantially upwards and the second direction is substantially downwards.

In certain embodiments, the first set of one or more first spring elements is characterized by a first combined spring constant, and the second set of one or more second spring elements is characterized by a second combined spring constant that is less than the first combined spring constant. Alternatively or additionally, in certain embodiments the first set of one or more first spring elements is characterized by a first combined compliance and the second set of one or more second spring elements is characterized by a second combined compliance that is greater than the first combined compliance. In certain embodiments, the second combined compliance is greater than the first combined compliance by a factor of at least 2. In certain embodiments, the second combined compliance is greater than the first combined compliance by a factor of at least 5. In certain embodiments the strike plate comprises an opening therethrough, wherein the opening is adapted to receive a portion of the piston rod. In certain embodiments, the top-mount assembly may include a bracket configured to attach to the vehicle body, wherein each first spring element is interposed between an inner surface of the bracket and a first face of the strike plate.

In another aspect, a suspension system is disclosed that may include: a damper assembly comprising a piston rod; a top-mount assembly comprising: a strike plate attached to the piston rod, a first set of one or more spring elements in contact with the strike plate, wherein the first set of one or more spring elements is characterized by a first combined spring constant; a second set of one or more spring elements in contact with the strike plate, wherein the second set of one or more spring elements is characterized by a second combined spring constant that is less than the first combined spring constant; wherein the piston rod and the first set of one or more spring elements are arranged such that, under static conditions: the second set of one or more spring elements applies a second combined force to the strike plate in a first direction, and the piston rod applies a static rod force to the strike plate in a second direction that is opposite the first direction, wherein a magnitude of the rod force is substantially equal to a magnitude of the second combined force. In certain embodiments, the damper assembly includes a housing defining an internal volume that is separated, by a piston slidably inserted into the housing, into a first volume and a second volume. In certain embodiments, the damper assembly includes a motor/pump that is in fluid communication with the first volume and/or the second volume and that is configured to controllably vary a pressure differential between the first volume and the second volume.

In another aspect, a top-mount assembly for attaching a suspension component to a vehicle body is disclosed, the top-mount assembly including a top-mount bracket; a strike plate located within the top-mount bracket, wherein the strike plate is movable relative to the top-mount bracket from a first position to a second position; a first spring element characterized by a first spring constant; a second spring element characterized by a second spring constant, wherein the first spring element and the second spring element couple the top-mount bracket to the strike plate; and wherein the first spring element and the second spring element are functionally arranged in parallel.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
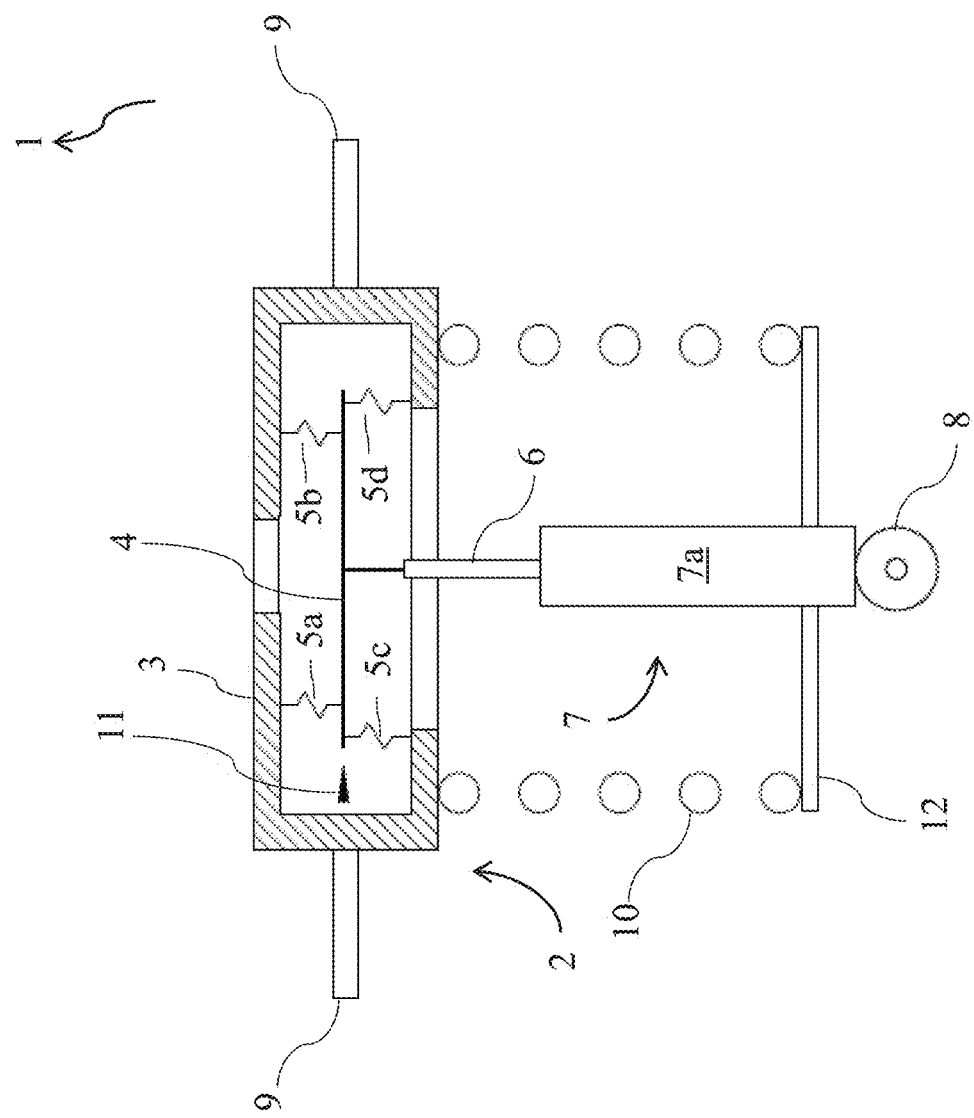
FIG. 1 is a schematic representation of a top-mount assembly.

The inventors have recognized that because of elevated operating pressure in certain suspension damper assemblies, such as is the case in active suspension systems, the operation of top-mounts or other compliant attachment devices that are interposed between damper assemblies and other portions of a vehicle, such as the vehicle body or wheel assembly, may be compromised. For example, these elevated pressures may lead to an increased static loading of a top-mount, or other compliant attachment device, which may cause these devices to be strained to such a degree that they operate in an undesirable stiffness range. For example, a top-mount may undergo sufficient strain due to static loading that it becomes undesirably stiff. Under these circumstances, when a dynamic load is applied, the top-mount does not have sufficient compliance as would normally be desired and/or its compliance may become highly non-linear in at least one direction. This may cause the top-mount to become less effective in damping out road disturbances.

Accordingly, the inventors have recognized the benefits associated with methods and apparatus that modify the operation of a top-mount, or other compliant attachment device, such that such static loading is at least partially counteracted, thereby allowing the top mount to operate in a range where the system compliance is in a more desirable operating range and/or the compliant attachment devices may otherwise exhibit a more desired behavior.

Typically, a suspension system damper assembly is mounted in a vehicle with the rod facing up in a vertical or near vertical direction. In some embodiments, the damper assembly may be mounted in a near horizontal or horizontal direction, in an "inverted" configuration, i.e. with the rod facing down and the damper body facing up, and/or where the suspension spring is co-located and concentric with the damper (typically called a "strut" assembly).

For the sake of clarity, in the embodiments described below, reference is made only to top-mounts. However, unless the context precludes such an interpretation, it should be understood that the current disclosure may be applied to any appropriate compliant attachment device or isolator between any two structures including but not limited to: a compliant isolating bushing, a lower bushing between a damper body of a suspension system and a wheel assembly, a compliant bushing between a damper piston rod of a suspension system and a wheel assembly when the damper is in and inverted rod-down arrangement.

In one embodiment, a top-mount assembly of a suspension system of a vehicle may include a strike plate that is configured to attach to a rod of a damper assembly and a top-mount bracket that is configured to attach to the vehicle body. In some instances, the strike plate may be attached to the damper assembly via a connection to the piston rod. As discussed previously, the damper assembly may be located between, and attached to, the top-mount assembly and a wheel assembly of the vehicle. In certain embodiments, the damper assembly may be interposed between the wheel assembly of the vehicle and the top-mount assembly, such that forces applied to the wheel assembly (e.g., because of driving over a road surface) may be transferred to the top mount assembly via the damper assembly.

Appropriate dampers for use in the damper assemblies described in the current disclosure, include, but are not limited to, passive dampers (e.g., hydraulic passive dampers), active dampers, semi-active dampers, magnetorheological dampers, and actuators (e.g., a hydraulic actuator). In certain embodiments, an active damper may include an actuator (e.g., a hydraulic actuator) that is capable of applying an active commanded force (e.g., a force in the direction of motion) onto the vehicle body (e.g., by means of the top-mount assembly and to the vehicle body) and/or the wheel assembly. The descriptions in this disclosure apply in much the same way if the damper assembly is mounted in the "traditional" rod-up direction, i.e. with the piston rod extending upwards or substantially upwards, relative to a bottom surface of the vehicle facing the ground, from the damper assembly body; in an "inverted" configuration, i.e. with the piston rod extending downward or substantially downward, relative to a bottom surface of the vehicle facing the ground, from the damper assembly body; as well as for systems where the suspension coil spring is co-located and concentric with the damper, i.e. a "strut" assembly. While specific orientations of a damper assembly have been noted above, it should be understood that the current disclosure may be used with a damper assembly, and/or actuator, arranged in any appropriate orientation as the disclosure is not so limited.

During operation, a rod (e.g., a piston rod) of a damper (e.g., an actuator) may be used to apply a first force directed along a longitudinal axis of the piston rod and in a first direction on the strike plate of a top mount assembly. For example, the first direction may be upward or approximately upward, or the first direction may be downward or approximately downward direction. In a passive suspension system, both a magnitude of the first force and the first direction are based on a stimulus force that is imparted onto the wheel assembly of the vehicle by a road surface. On the other hand, in an active suspension, the magnitude and the first direction of the first force may be based on the stimulus force (e.g., an active suspension system may be configured to operate as a passive suspension system), or they may be commanded (e.g., by a processor) independently of the stimulus force provided by the road surface.

In the case of a hydraulic damper (e.g., a hydraulic actuator), under static conditions (e.g., in the absence of a stimulus force and/or in the absence of a commanded force), the rod may apply a static force having a static direction such as, for example, upwards or approximately upwards. Such static force may arise as a result of geometrical considerations of a piston and the piston rod of the hydraulic damper. Application of the static force to the strike plate of the top-mount assembly by the rod of the damper may be referred to as "static loading."

In certain embodiments, the strike plate may be enclosed by a top-mount bracket. In certain embodiments, a first spring element may be located between the top-mount bracket and the strike plate. The first spring element may be pre-stressed during manufacture and/or assembly such that it applies a prestress force on the strike plate in a direction substantially opposite to the static direction. A second spring element is located between the strike plate and the top-mount bracket. Under static conditions, the second force applied by the first spring element may counter balance at least a portion of the static force applied on the strike plate by the rod of the damper.

A spring element may refer to any element that deforms by an amount that is proportional to an applied force and, upon removal of the applied force, regains or approximately regains its original dimensions. Examples of spring elements include coil springs, conical springs, and pieces of resilient material such as, for example, elastomers (e.g., rubber). It is understood that a single physical piece of resilient material (e.g., rubber) may comprise a plurality of spring elements.

Having discussed the current disclosure generally above, certain exemplary embodiments are now described in more detail in relation to the figures to provide an overall understanding of the principles of the structure, function, manufacture, and use of the system and methods disclosed herein for a top-mount system. However, it should be understood by one of ordinary skill in the art that the systems, methods and examples described herein and illustrated in the accompanying drawings are non-limiting exemplary embodiments. Further, it should be understood that the various features illustrated or described in connection with the different exemplary embodiments described herein may be combined with features of other embodiments and the features may be used individually, singularly and/or in various combinations as the disclosure is not so limited. Such modifications are intended to be included within the scope of the present invention.

The schematic in FIG. 1 illustrates a vehicle suspension assembly 1 that includes a top-mount assembly 2, with a top-mount bracket 3 and top-mount strike plate 4. The top mount bracket at least partially encompasses a flat disk shaped, or otherwise appropriately shaped, top-mount strike plate 4. The strike plate typically includes an opening therethrough that is configured to receive a portion a rod 6 of the damper assembly 7.

The rod 6 may be a piston rod that is attached to a piston (not shown) of the damper assembly 7, or, as in the case of an inverted configuration, it may be a rod 6 that is attached to a housing of the damper assembly 7. An exemplary damper assembly may include a housing defining an internal volume that is separated into a first volume and a second volume by a piston slidably inserted into the housing, and a piston rod attached to the piston. Additionally, in certain embodiments the damper assembly may further include a motor/pump in fluid communication with the first volume and second volume, wherein the motor/pump may be configured to controllably vary a pressure differential between fluid in the first volume and fluid in the second volume. In these embodiments, the damper assembly may be referred to as an actuator or an actuator assembly. Static conditions of such an actuator may refer to conditions when pressure of fluid in the first volume is equal to pressure of fluid in the second volume, such that the pressure differential is zero.

The rod may be securely attached to the strike plate using a fastener such as, for example, a nut or any other appropriate fastening mechanism. In the embodiment in FIG. 1, a set of spring elements 5a-d, each of which may operate under tension or compression, are interposed between the strike plate and the top-mount bracket 3. As illustrated, the set of spring elements 5a-d may include upper spring elements 5a-b and lower spring elements 5c-d. In the illustrated embodiment, the upper spring elements 5a-b are interposed between an inner surface of the top-mount bracket 3 and a top face of the strike plate 4, while the lower spring elements 5c-d are interposed between the inner surface of the top mount bracket 3 and a bottom face of the strike plate 4. It is understood that the set of spring elements 5a-d may be embodied in a single piece of resilient material, or in various pieces of resilient material, located in the volume defined by the inner surface of the top mount bracket 3 and the strike plate 4. In certain embodiments, this may be accomplished by molding the resilient material onto the strike plate 4.

Spring constants of each of the spring elements 5a-d may be combined using equations known in the art to determine a single, combined spring constant. For example, a set of n spring elements oriented in a parallel arrangement may be characterized by a single combined spring element using the equation $k_{combined} = k_1 + k_2 + k_3 \ldots + k_n$, where $k_{combined}$ represents the combined spring constant and $k_1$, $k_2$, $k_3$, $k_n$ represent a respective spring constant of spring elements 1, 2, 3, and n. Likewise, a set of n spring elements oriented in a series arrangement may be characterized by a single combined spring element using the equation $(k_{combined})^{-1} = (k_1)^{-1} + (k_2)^{-1} + (k_3)^{-1} \ldots + (k_n)^{-1}$. As would be recognized by one of ordinary skill in the art, these equations and principles may be modified appropriately such that any set of spring elements oriented in any manner may be characterized by a single combined spring constant and/or a combined compliance. Likewise, individual forces applied by each of the spring elements 5a-d onto the strike plate 4 may be summed to determine a single combined force that is applied by the set of spring elements 5a-d onto the strike plate 4.

Continuing with FIG. 1, the strike plate may be attached to a top end of the rod 6 (e.g., the piston rod) of a damper assembly 7. The damper assembly 7 may be disposed between the top-mount assembly 2 and a wheel assembly 8 of a vehicle (not shown). In active suspension systems, the damper assembly 7 may include an actuator. The top-mount assembly may be securely attached to the vehicle body by using one or more flanges 9 and attachment devices (not shown), such as for example, bolts or threaded studs. Typically, under static conditions, i.e. when the vehicle is stopped on a flat horizontal surface and, in the case of an active suspension system, no force is commanded of the actuator, the weight of the vehicle is supported primarily by a coil spring 10 that may be interposed between the top-mount assembly 2 and a spring perch 12. In various embodiments, the spring perch 12 may be attached to a bottom end of the damper body 7a or may be attached to the wheel assembly 8.

Prior to attachment of the rod 6 to the strike plate 4, the strike plate 4 may be located at a neutral position 11 relative to the top-mount bracket 3. In the neutral position 11, the combined force applied by the set of spring elements 5a-d onto the strike plate may be approximately equal in magnitude to the weight of the strike plate, and in an opposite direction. In certain embodiments, the weight of the strike plate and stiffness of each of the spring elements 5a-d may be chosen such that, when the strike plate is located in its neutral position 11, one or more of the spring elements are in an unstressed or nearly unstressed state. However, various levels of stress may also be present as the disclosure is not so limited. Following attachment of the rod 6 to the strike plate 4, the rod 6 may apply a static force to the strike plate 4 as discussed above. This static force may cause the strike plate 4 to shift its position away from the neutral position 11. As would be recognized by one of ordinary skill in the art, the magnitude of the static force may be related to the operating (or equilibrium) pressure of the damper.

In passive suspension systems, under static conditions, the static force applied on the strike plate 4 by the rod 6 is minimal such as, for example, less than 20 N, less than 50 N, less than 100 N, or less than 500 N. This may be due, at least in part, to the relatively low operating pressures utilized by passive dampers. In these cases, under static conditions, the combined force applied on the strike plate 4 by the set of spring elements 5a-d and the static force applied on the strike plate 4 by the rod 6 may be in equilibrium such that the strike plate remains at or near its neutral position 11 in FIG. 1.

When a position of the strike plate 4 relative to the top-mount bracket 3 deviates from the neutral position 11, each of the spring elements 5a-d become compressed or extended. For example, in the embodiment of FIG. 1, upward movement of the strike plate 4 with respect to the neutral position 11 may cause the upper spring elements 5a-b to be under compression and/or causes the lower spring elements 5c-d to be under tension. The set of spring elements 5a-d are typically designed to exhibit effectively a constant combined compliance or combined stiffness over a first range of positions of the strike plate 4 relative to the top-mount bracket 3. Beyond that range, over a second range of positions, the combined compliance of the set of spring elements 5a-d is typically reduced (i.e., the combined stiffness is increased) in order to limit relative motion within the top-mount assembly, for example, to avoid damage to the top-mount. However, in this second range of reduced compliance, the top-mount is substantially stiffer which may lead to a harsher ride in the vehicle. In some embodiments, it is, therefore, desirable to minimize operation of the top mount in this second position range.

Figure 18:
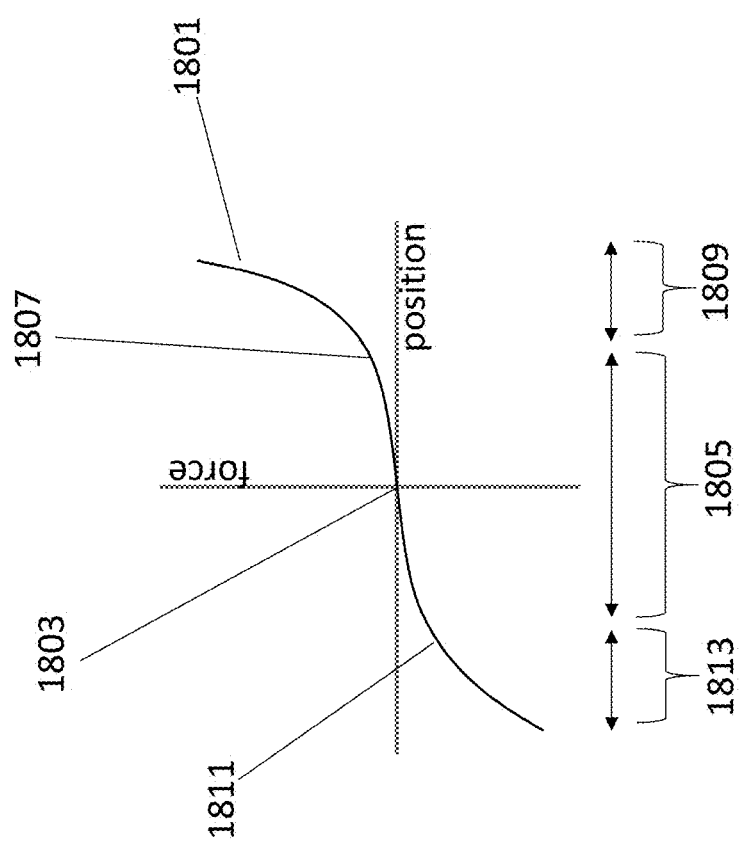
FIG. 18 illustrates an exemplary force-displacement curve.

The above behavior is illustrated by the force-position curve shown in FIG. 18. The x-axis of the plot represents position of the strike plate 4 relative to the top mount bracket 3. The origin 1803 of the curve 1801 represents the neutral position of the strike plate 4; positive x-values represent deviation of a position of the strike plate 4 in a first direction (e.g., in the upwards direction of FIG. 18) with respect to the neutral position 11; and negative x-values represent deviation of a position of the strike plate 4 in a second direction (e.g., downwards direction of FIG. 18) with respect to the neutral position 11. "Position" of the strike plate 4, or "strike plate position," is understood to refer to position of the strike plate 4 relative to the top-mount bracket 3. The y-axis in FIG. 18 represents the combined force applied by the set of spring elements 5a-d on the strike plate 4 when the strike plate 4 is located in a corresponding position given by the x-axis. The combined stiffness of the set of spring elements 5a-d is given by the derivative of the curve shown in FIG. 18 and, as discussed above, may depend on the position of the strike plate 4 relative to the neural position 11.

In the illustrated example, when the strike plate 4 is located at its neutral position 1803 (e.g., x=0 in the curve shown in FIG. 18), the combined force applied by the set of spring elements 5a-d is zero or effectively zero. This indicates that the weight of the strike plate is minimal or negligible as compared to the combined stiffness of the set of spring elements. Further, the combined stiffness of the set of spring elements (given by the derivative of the curve) for a first range 1805 of positions (e.g., a first range of positions located adjacent to the neutral position 1803), may be relatively low (e.g., less than 100 N/mm, less than 500 N/mm, less than 1,000 N/mm). Further, the combined stiffness of the set of spring elements within the first range 1805 may be effectively constant (e.g., the combined stiffness at any point within the first range may vary no more than 2%, more than 5%, more than 10%, or more than 20% of the mean over the range). Upon deviation of the strike plate position beyond a first threshold 1807 in the first direction, the combined stiffness of the set of spring elements may increase substantially and become relatively high (e.g., greater than 100 N/mm, greater than 500 N/mm, greater than 1000 N/mm) for a second range of positions 1809. Likewise, upon deviation of the strike plate position beyond a second threshold 1811 in the second direction, the combined stiffness of the set of spring elements may increase substantially and become relatively high (e.g., greater than 100 N/mm, greater than 500 N/mm, greater than 1000 N/mm) for a third range of positions 1813.

Figure 2:
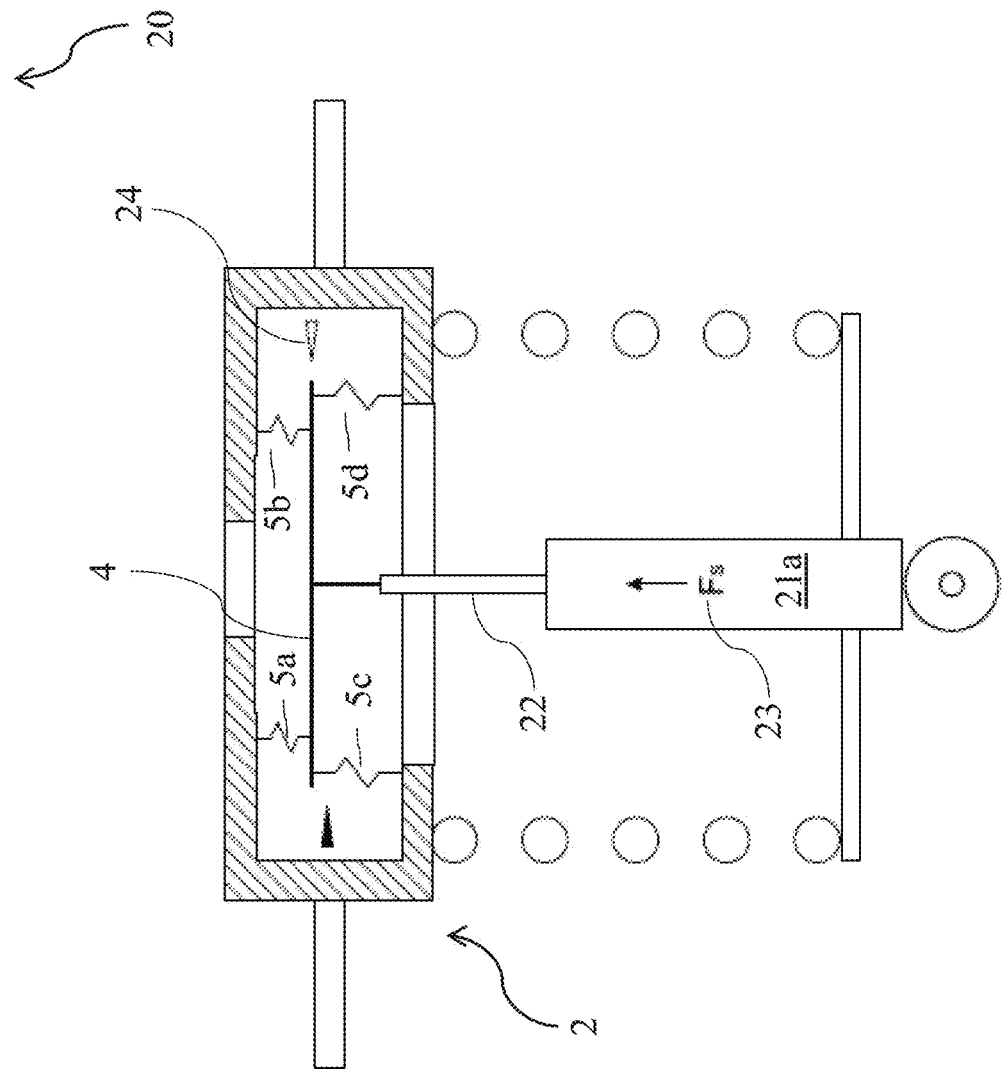
FIG. 2 is a schematic representation of the top-mount assembly of FIG. 1 exposed to a piston rod force under static conditions.

In some embodiments, such as active suspension actuators, the operating pressure in the damper body may be elevated to, for example, several hundred pounds per square inch. The applicant has discovered that this elevated pressure results in a resultant static force on the damper piston that is conveyed to the piston rod and the strike plate 4. FIG. 2 illustrates a suspension assembly 20, which includes a damper housing 21a with an elevated operating pressure. Under static conditions, the elevated operating pressure results in a significant static force $F_s$ 23 that is applied to the strike plate 4 of the top-mount assembly 2. In some embodiments, the elevated system pressure may be, for example, between 400-500 psi. This may result in a static force, $F_s$, of, for example, between 800 N-900 N or greater depending on the characteristic dimensions of the piston and piston rod. It is noted that elevated operating pressures, both above and below the above range, and above and below 800 N-900 N may be used as the disclosure is not so limited.

FIG. 2 depicts the damper system of FIG. 1 in which the damper body 21a is charged to an elevated pressure. In this depicted configuration, the static force 23, which scales with the operating pressure of the damper body 21a, causes the strike plate 4 to shift away from the neutral position 11 until the combined force applied to the strike plate 4 by the set of the spring elements 5a-d sufficiently counteracts the static force, $F_s$, applied to the piston rod by the damper. As a result of the static force applied on the strike plate, the strike plate finds a new position, referred to herein as the loaded position 24. In the loaded position 24, the upper spring elements 5a-b are compressed and the lower spring elements 5c-d are extended. While four spring elements have been depicted in the figure, it should be understood that any number of spring elements may be disposed between the strike plate and the bracket as the disclosure is not so limited.

In some embodiments, the static force Fs may be sufficiently large, such that at the loaded position 24, the compliance of one or more of the spring elements is decreased and one or more of the spring elements becomes sufficiently stiff to reduce the effectiveness of the top-mount in responding to disturbances that may be transmitted up the piston rod to the vehicle body. In other words, referring to FIG. 18, the loaded position 24 may lie outside of, or near the edge of, the first range 1805 of positions, thereby impeding overall performance of the top-mount.

Figure 3:
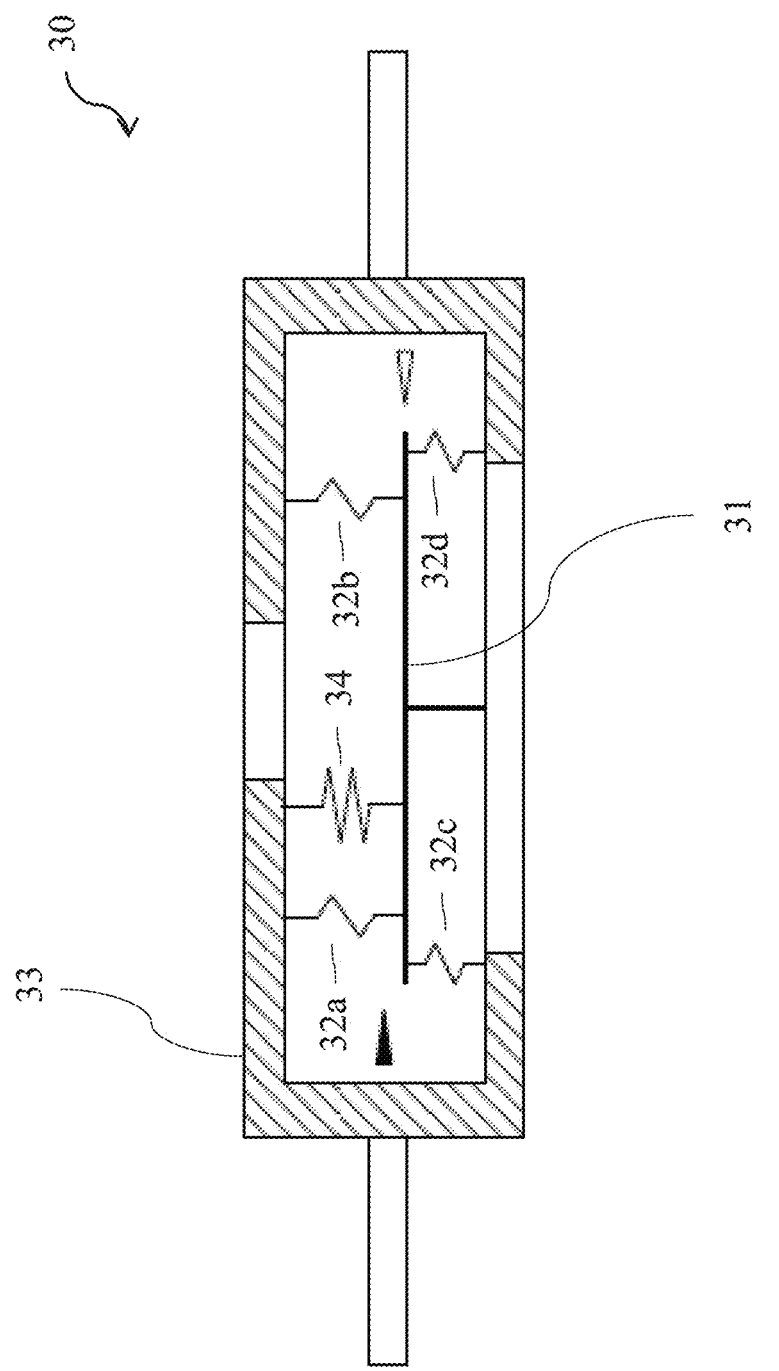
FIG. 3 is a schematic representation of an embodiment of a top-mount with a spring element that is pre-stressed during manufacture.

FIG. 3 illustrates another embodiment of a top-mount assembly 30 prior to attachment to a rod of a damper. The illustrated top-mount assembly includes a strike plate 31 and a first set of one or more spring elements 32a-d, each of which is interposed between the strike plate 31 and top-mount bracket 33. In addition, the top mount assembly also includes a second set of one or more spring elements 34 that are used to pre-stress the top-mount assembly. In certain embodiments, the second set of one or more spring elements 34 may be functionally arranged in parallel to the first set of spring elements 32a-d. Two spring elements are said to be functionally arranged in parallel if the combined force applied by the two spring elements is equal to the sum of the individual forces applied by each spring element.

Figure 4:
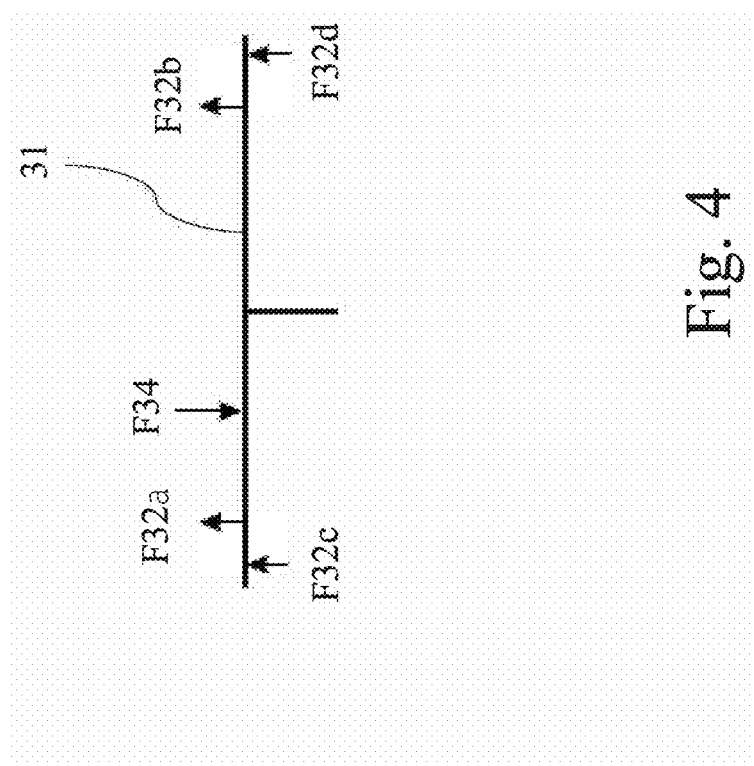
FIG. 4 is a free-body diagram of the strike plate of the top-mount in FIG. 3 under pre-installation loading.

The pre-stress force applied by the second set of spring elements 34 moves the strike plate to a position, referred to as a pre-stressed position, thereby compressing lower spring elements 32c-d while extending upper spring elements 32a-32b. An exemplary arrangement of forces acting on the strike plate 31 in the pre-stressed position are shown in FIG. 4. Disregarding the weight of the strike plate 31 as negligible compared to the pre-stress force, a magnitude of the pre-stress force applied to the strike plate by the second set of spring elements, F34, is equal to the magnitude of the combined force applied to the strike plate by the first set of spring elements, F32a+F32b+F32c+F32d.

The inventors have recognized that, in certain embodiments, it may be advantageous to design the top mount assembly (e.g., to select spring elements with appropriate spring constants) such that a combined compliance second set of spring elements is greater than a combined compliance of the first set of spring elements 32a-d. If the second set of spring elements have a combined stiffness that exceeds that of the first set of spring elements, then vibrations of the rod of the damper could be undesirably transferred to the vehicle body through the second set of spring elements. By designing the system such that the second set of spring elements is substantially more compliant than the first set of spring elements, vibrations of the piston rod may be partially absorbed or damped by the first set of spring elements without being fully transmitted into the vehicle body. In some embodiments, the combined compliance of the second set of spring elements 34 is greater than the combined compliance of the first set of spring elements 32a-d by a factor of at least 2. In some embodiments, the combined compliance of the second set of spring elements 34 may be greater than the combined compliance of the first set of spring elements 32a-d by a factor of at least 5 or a factor of at least 10. As would be recognized by one of skill in the art, spring constant and/or compliance of a spring element may be varied using a variety of techniques including, for example, by varying material of construction and/or by varying geometry (e.g., cross-sections) of the spring elements.

The combined compliance of the second set of springs may be selected to be any convenient value as the disclosure is not so limited. However, embodiments, in which the second set of spring elements has a combined compliance that is less than or equal to the other spring elements are also contemplated.

In some embodiments, the top-mount assembly in FIG. 3 may be pre-stressed during the manufacturing process or alternatively or additionally during the assembly process of the suspension system.

Figure 5:
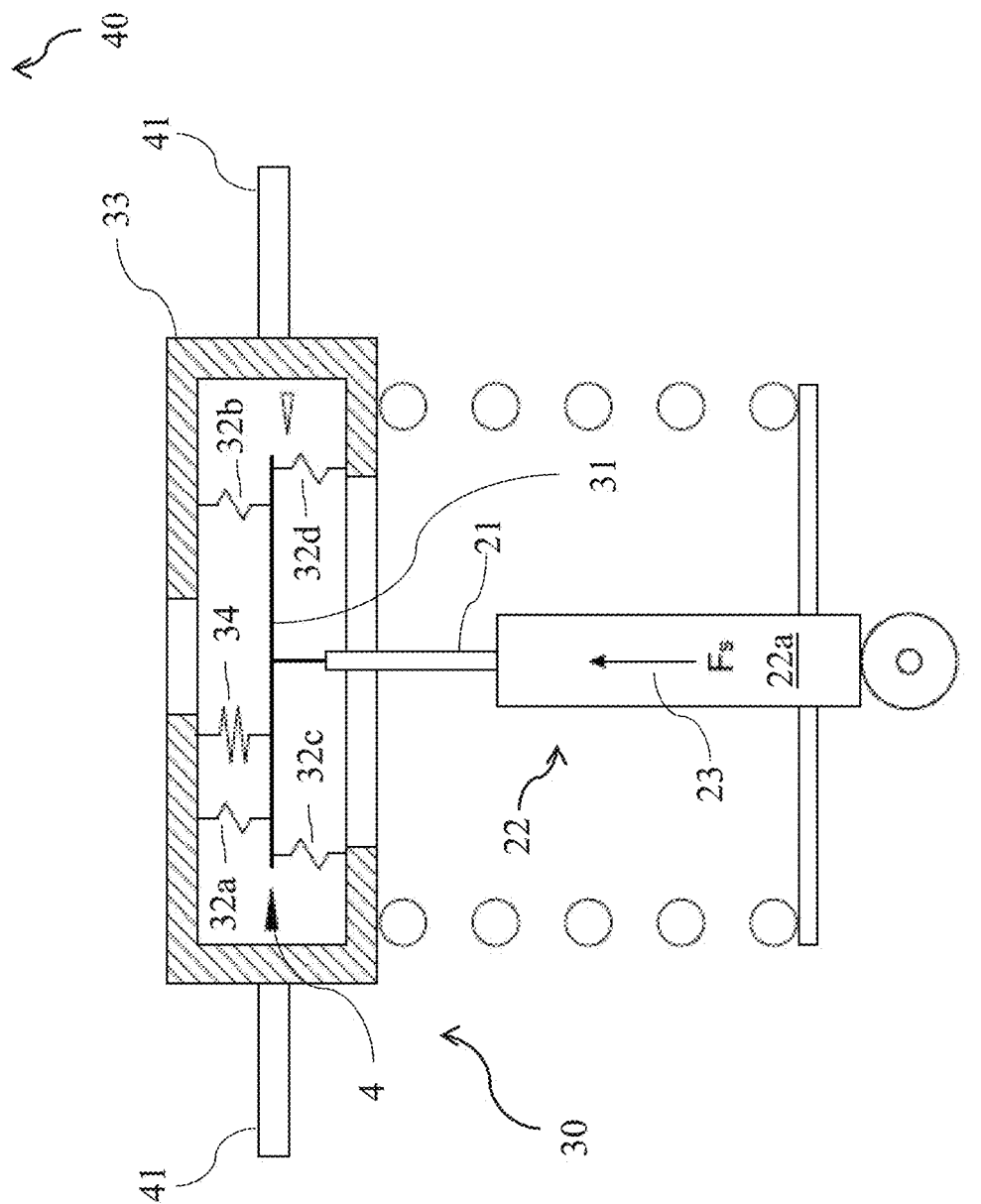
FIG. 5 is a schematic representation of the top-mount of FIG. 3 attached to a piston rod of a suspension damper assembly.

FIG. 5 illustrates the top-mount assembly of FIG. 3 following attachment to a rod 21 of a damper assembly 22. As discussed elsewhere herein, the operating pressure of damper body 22a causes the rod 21 to apply a static force on the strike plate 31.

In some embodiments, the second set of spring elements 34 may be designed such that, due to the attachment of the strike plate to the rod 21, static force 23, $F_s$, applied to the strike plate by the rod may cause the strike plate 31 to move to a loaded position that falls within the range where the combined compliance (or combined stiffness) of the first set of spring elements 32a-d is substantially constant. For example, referring to FIG. 18, the pre-stressed position may fall outside of, or near the limits of, the first range 1805 of positions. Attaching the rod of the damper to the strike plate, thereby applying the static force to the strike plate, may shift the position of the strike plate to within, or to a more central point within, the first range 1805 of positions.

Figure 6:
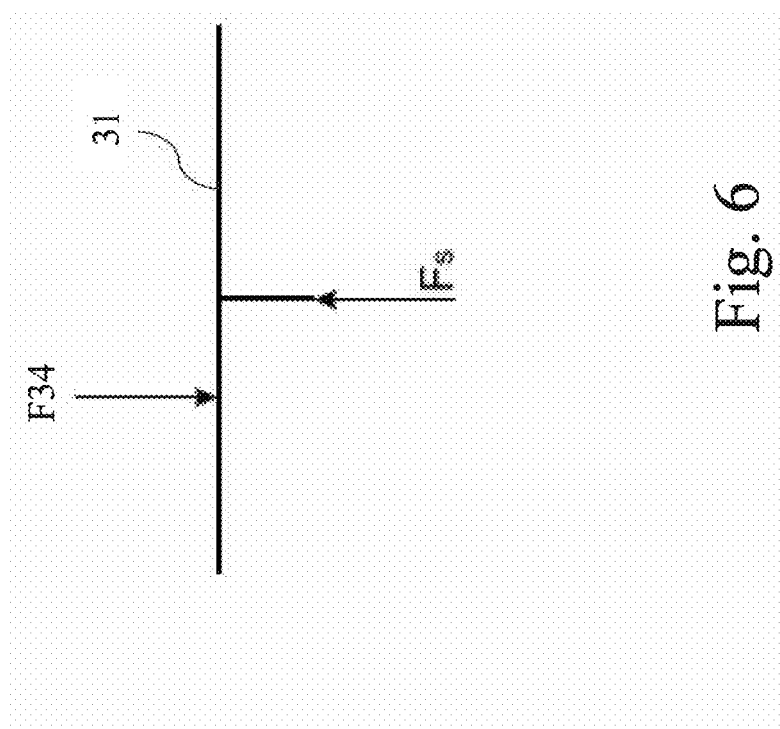
FIG. 6 is a free-body diagram of the strike plate of FIG. 5 under static loading conditions where the force applied by the pre-stressed spring element at least partially cancels the piston-rod force.

The operating pressure in the damper (and, therefore, the static force applied by the rod of the damper) and/or the pre-stress force applied by the second set of spring elements 34 may be selected so that when the static force is transmitted to the strike plate (under static conditions) by the rod, the strike plate is moved to a loaded position that is the same as or approximately the same as its neutral position 11. This may be accomplished by selecting an operating pressure and a second set of spring elements wherein the pre-stress force applied to the strike plate by the second set of spring elements 34 substantially balances (e.g., has a magnitude equal to or substantially equal to, and a direction opposite to) the static force $F_s$ applied to the strike plate by the rod. This force balance is illustrated in FIG. 6. As illustrated by the free-body diagram shown in FIG. 6 of strike plate 31, under static conditions, the combined force applied by the second set of spring element 34 may balance the static force applied by the rod 21. In this exemplary case, the combined force of the first set of spring elements 32a-d ranges from zero or approximately zero (that is, the first set of spring elements 32a-d is effectively unstressed) to approximately equal to the weight of the strike plate. The static force applied by the rod may range from 700 N to 2000 N, although static forces greater and smaller that this range are contemplated as the disclosure is not so limited. As used herein, two values are said to be substantially equal if the absolute value of the difference between the two values is no greater than 5%, no greater than 10%, no greater than 15%, no greater than 20%, no greater than 25%, or no greater than 30% of the larger of the two values.

In some embodiments, upon attaching the rod of the damper, the strike plate is moved to a loaded position near its neutral position, and the first set spring elements 32a-d of FIG. 5 operate in a region of effectively constant compliance (or effectively constant stiffness) under normal operating conditions. That is, referring to FIG. 18, the loaded position may fall within the first range 1805 of positions. In one embodiment, normal operating conditions may be considered conditions where the damper exerts a force onto the strike plate that does not typically exceed ±1000 N, 1250 N, 1500 N, 2000 N, and 3000 N. However, embodiments in which damper forces both greater and smaller than those noted above are also contemplated.

The top-mount assembly 30 may be securely attached to a vehicle body by means of, for example, one or more flanges 41, and/or rims, collars, ribs, or other projections that can be used for this purpose. The top-mount assembly may also be attached to the vehicle body by means of threaded studs that protrude from the top-mount bracket 33. In certain embodiments, the top-mount bracket 33 may comprise a top portion and a bottom portion configured to be attached to the upper bracket.

Figure 7:
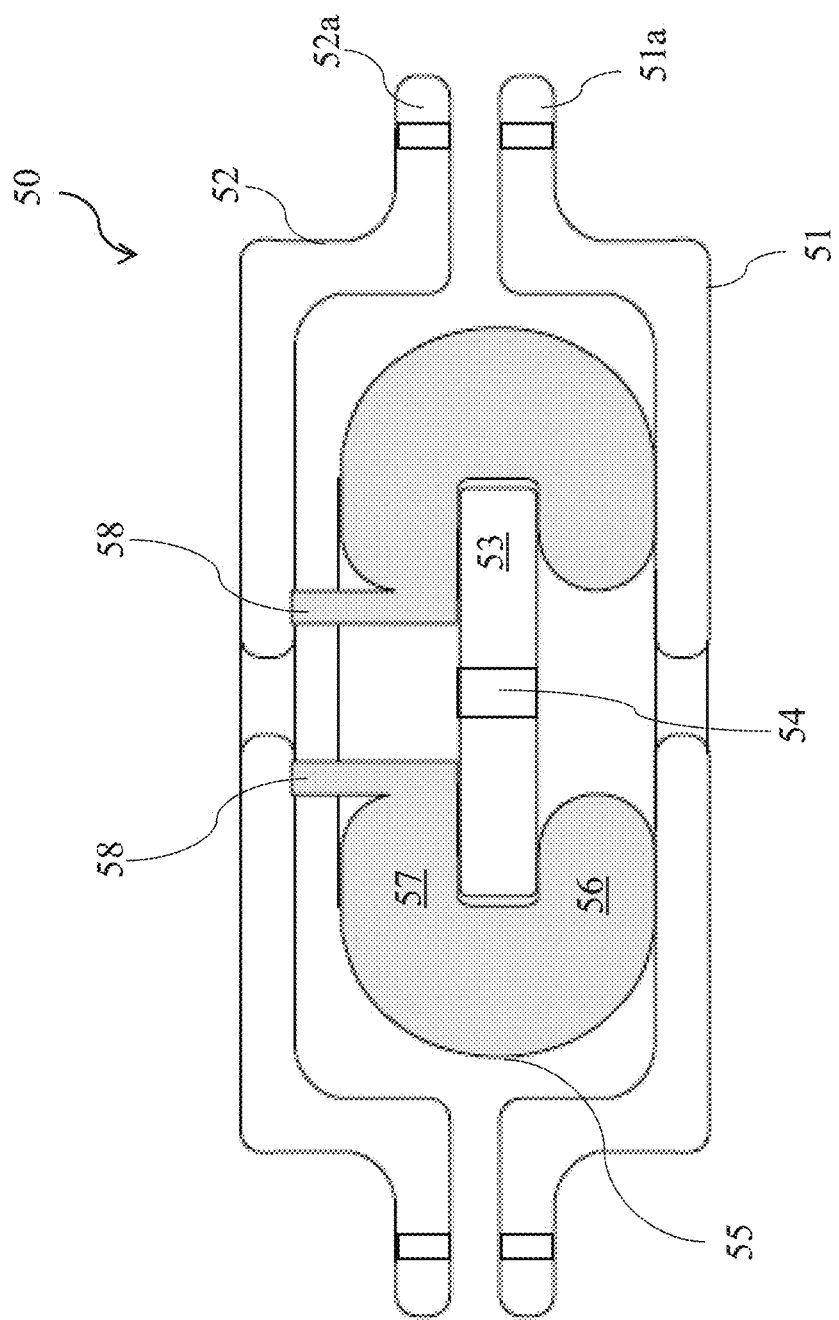
FIG. 7 is a schematic representation of an embodiment of a top-mount assembly with an elastomeric unit that performs the function of three spring elements.

FIG. 7 illustrates one embodiment of a top-mount assembly 50 with a two-piece bracket. The bottom portion 51 of the bracket includes a central bowl-shaped hub with flange 51a extending radially outwardly from the rim of the top opening of the hub. The top portion 52 of the bracket may be a mirror image of the lower portion 51 of the bracket, and may also include a radially outwardly extending flange 52a that surrounds the rim of the lower opening in the top portion 52 of the top-mount.

The depicted embodiment of a top-mount assembly 50 may also include a strike plate 53 with a centrally located through-hole 54. The strike plate 53 may be partially embedded in an annular elastomeric member 55 that performs as the set of spring elements 56, 57, and 58. Elastomeric materials may include, for example, polyurethanes, viscoelastic materials, reinforced rubber, filled silicone and polymers/elastomers (filling may be with, for example, nylon, metal, plastic, different material fibers, etc.). The spring elements 56, 57, and 58, shown in FIG. 7 therefore form a single physical unit, but may be considered separate spring elements. Further, in some embodiments, each spring element may have a different or the same material composition as the other spring elements. In some embodiments, one or more of the elastomeric spring elements may include non-elastomeric materials such as steel, hard plastics, and metals. The non-elastomeric substances may include various types of springs such as, for example, Belleville spring washers, coil springs, bellows, etc.

In certain embodiments, as illustrated, the elastomeric member 55 may be annular and the strike plate may be located in an internal cavity at least partially defined by an inner surface of the elastomeric member 55. The elastomeric member 55 may include an annular body. The annular body may include a first portion interposed between a lower face of the strike plate 53 and an inner surface of the bottom portion 51 of the bracket. The first portion of the annular body may act as the spring elements 32c-d from FIG. 3. The annular body may further additionally include a second portion interposed between an upper face of the strike plate 53 and an inner surface of the top portion 52 of the bracket. The second portion of the annular body may act as the spring elements 32a-b from FIG. 3. The first and second portions of annular body may be in physical contact with, or physically attached to, the strike plate. Thus, the first and/or second portions of the annular body may act as the first set of spring elements as described with respect to FIG. 3 and/or FIG. 5. The annular body may be sized such that, upon attachment of the top portion 52 of the bracket to the bottom portion 51 of the bracket, the annular body is in physical contact with the inner surface of the top portion of the bracket, the inner surface of the bottom portion of the bracket, and the strike plate.

Figure 8:
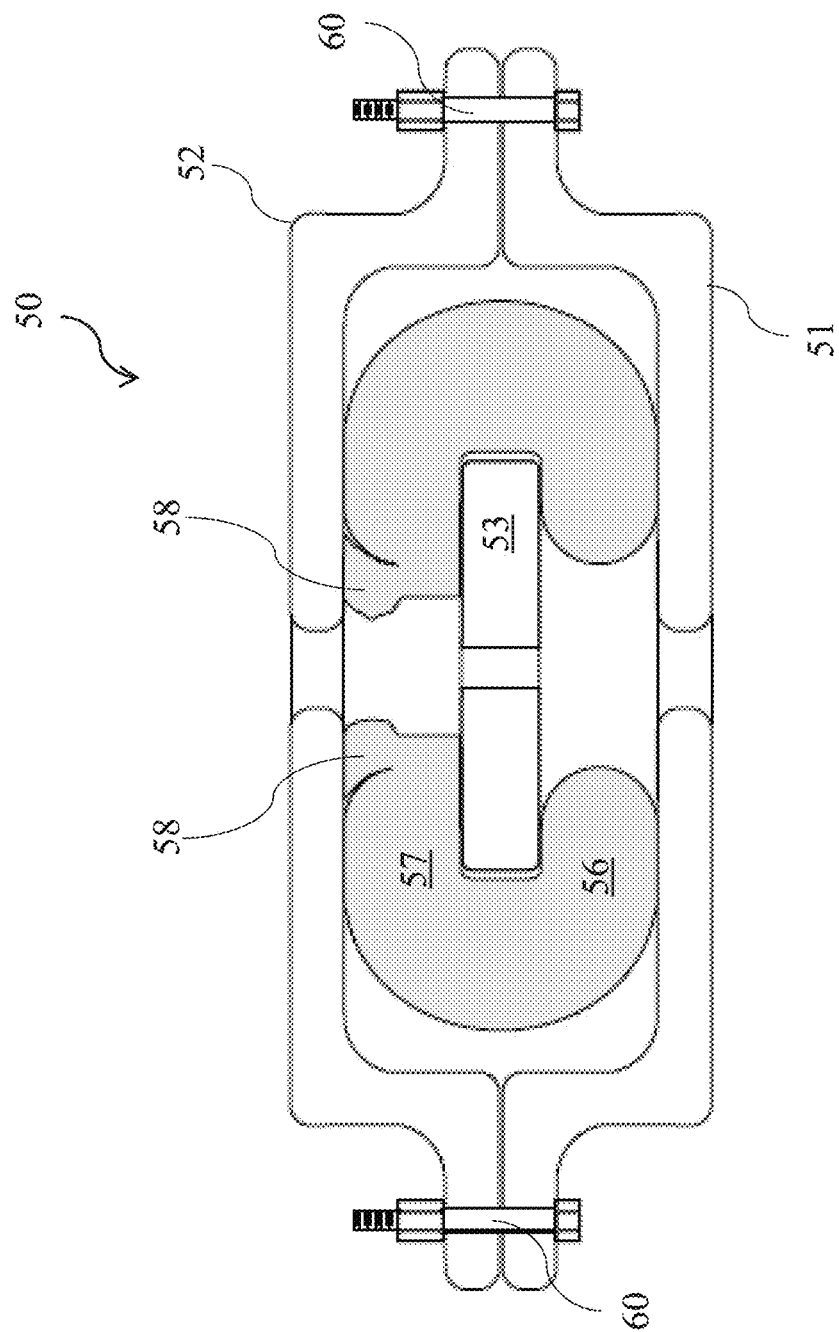
FIG. 8 is a schematic representation of the top-mount of FIG. 7 where the top and bottom halves are attached and at least two of the spring elements are pre-stressed.

The elastomeric member 55 may further include a protruding portion 58 interposed between the upper face of the strike plate 53 and the inner surface of the top portion 52 of the bracket. The protruding portion may be dimensioned such that, upon attachment of the top portion 52 of the bracket to the bottom portion 51 of the bracket, the protruding portion becomes substantially compressed (e.g., substantially compressed relative to its unstressed dimension). For example, FIG. 7 illustrates the top mount assembly 50 prior to assembly of the top mount bracket (e.g., prior to attachment of the upper portion 52 of the bracket to the lower portion 51 of the bracket), while FIG. 8 illustrates the same top mount assembly following assembly of the top mount bracket (e.g., after attachment of the upper portion 52 of the bracket to the lower portion 51 of the bracket). As can be seen by comparing the dimension of the protruding portion 58 in FIG. 7 and FIG. 8, following assembly of the top-mount bracket, the protruding portion is substantially compressed. In response to the compression, the protruding portion imparts a restoring force on the top mount bracket in a first direction (e.g., upwards) and on the strike plate in a second direction (e.g., downwards). In other words, the protruding portion 58 of the elastomeric member 55 may serve as the second set of spring elements described in relation to FIG. 3 and/or FIG. 5. The restoring force applied by the protruding portion 58 of the elastomeric member 55 applies the pre-stress force to the strike plate.

Alternatively or additionally, pre-stress force can be applied to the strike plate via a variety of manufacturing methods. For example, in certain embodiments, the strike plate may be held at a first position below its neutral position, and an elastomeric precursor may be poured into a first volume defined by the upper face of the strike plate and the inner surface of the top portion of the bracket. The elastomeric precursor may be cured or otherwise reacted to yield a first elastomeric material in the first volume. After the first elastomeric material is formed in the first volume, the position of the strike plate may be raised relative to the first position and held in place (e.g., using a clamp or similar device), thereby compressing the first elastomeric material. While holding the strike plate in the raised position, elastomeric precursor may then be poured into a second volume defined by the bottom face of the strike plate and the inner surface of the bottom portion of the bracket. The elastomeric precursor in the second volume may then be cured or otherwise reacted to yield a second elastomeric material in the second volume. Even upon releasing the strike plate, the first elastomeric material is therefore maintained in a state of residual compression, and reacts by applying a restoring force onto the strike plate that acts as the above-described pre-stress force. Alternatively or additionally, the curing process may be modified, as known in the art, to impart various residual compressive or tensile stresses into the elastomeric member.

Figure 9:
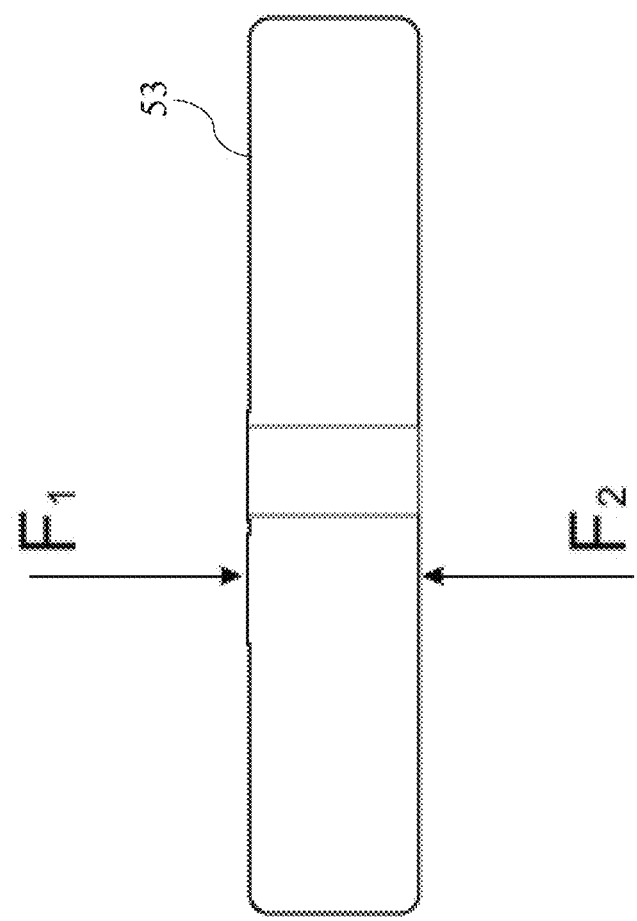
FIG. 9 is a free-body diagram of the strike plate of the top-mount of FIG. 8.

FIG. 9 shows the free-body diagram of the strike plate 53 of FIG. 8. $F_1$ is the force applied by the spring element 58 and $F_2$ is the force applied by the spring element 56. In this embodiment, spring element 57 is unstressed or lightly stressed and applies negligible force on the strike plate.

Figure 10:
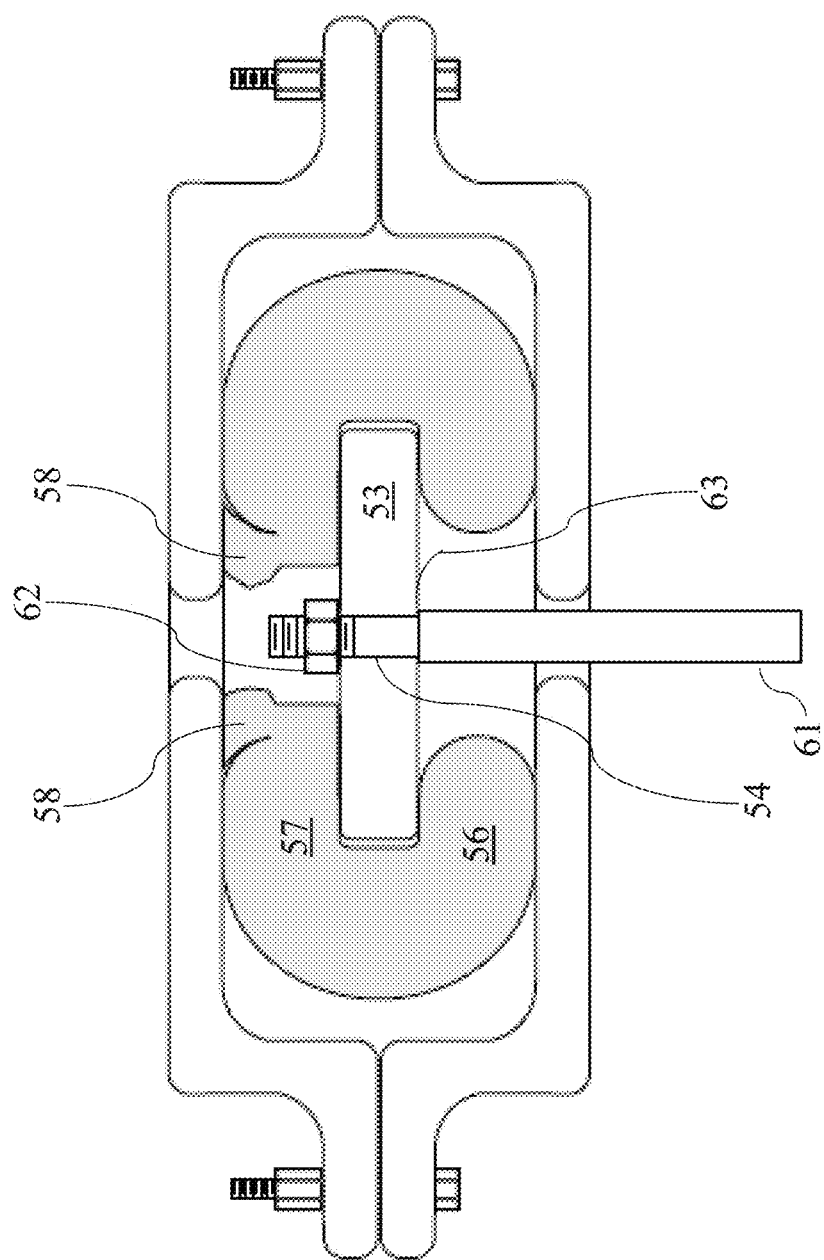
FIG. 10 is a schematic representation of the top-mount assembly of FIG. 8 attached to a piston rod of a suspension damper assembly where the piston rod applies a force on the strike plate under static conditions.

In FIG. 10, the threaded end of the piston rod 61 of a damper (not shown) is received in centrally located through-hole 54 and attached to the strike plate 53 by means of a nut 62. The strike plate is held securely between the nut 62 and the radially extending annular shoulder 63 of piston rod 61. In some embodiments, the force applied to the strike plate by the piston rod is equal and opposite to the force applied by the spring element 58.

Figure 11:
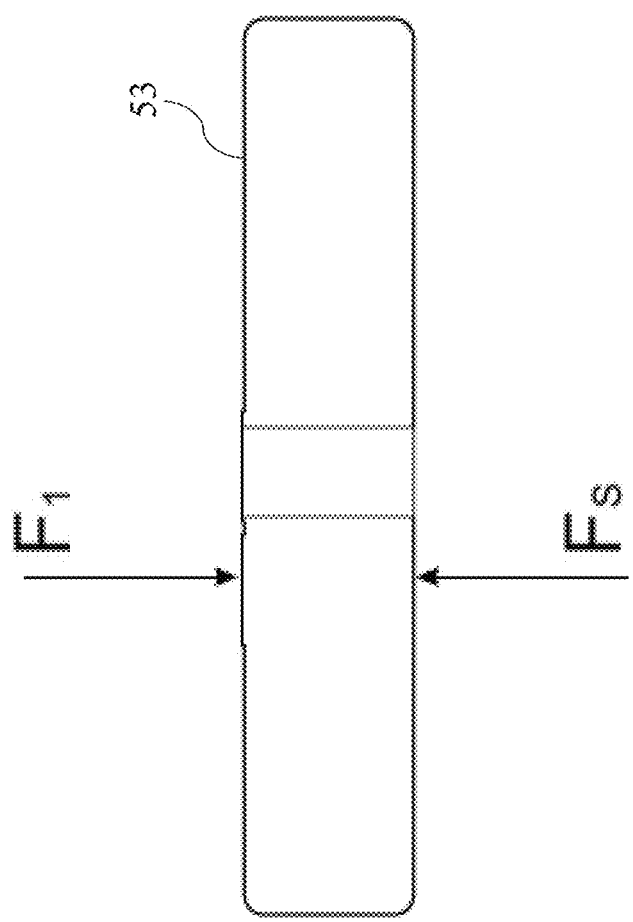
FIG. 11 is a free-body diagram of the strike plate of the top-mount of FIG. 10.

As shown in the free-body diagram in FIG. 11, the protruding portion 58 may be designed (e.g., by selecting appropriate dimensions and material properties) such that, following assembly of the top-mount bracket and attachment of the rod of the damper, the protruding portion 58 applies a force onto the strike plate 53 that at least partially counterbalances the static force applied by the rod of the damper. In certain embodiments, under static conditions the spring elements 56 and 57 are unstressed.

In some embodiments, the forces $F_1$ and $F_s$ substantially, but not fully, cancel each other and as a result, a small amount of residual stress may remain in spring element 56. Substantial cancellation may be greater than 90%, greater than 70%, greater than 50% or any other convenient percentage less than these percentages, as this disclosure is not so limited.

In some embodiments, a spring constant of the spring element 58 may be substantially less than the combined spring constant of the other spring elements interposed between the strike plate and the bracket. A substantially smaller spring constant of a spring element is one that is 10% or less of the spring constant of a second spring element. In some embodiments, a substantially smaller spring constant is one that 25% or less, 50% or less, or 75% or less of the spring constant of another element or any other convenient percentage, as this disclosure is not so limited.

In the embodiment in FIG. 10, balancing the force $F_s$ of the piston rod 61 with the force applied by spring element 58 allows the other spring elements to be substantially or completely unstressed after the strike plate is attached to the piston rod.

In the embodiment shown in FIG. 10, by balancing the piston rod force with the force in spring element 58, spring elements 56 and 57 predominantly operate in a largely constant range of their compliance, meaning that the compliance does not change, for example, by more than 2%, 5%, 10%, 20% in extension and/or compression.

Figure 12:
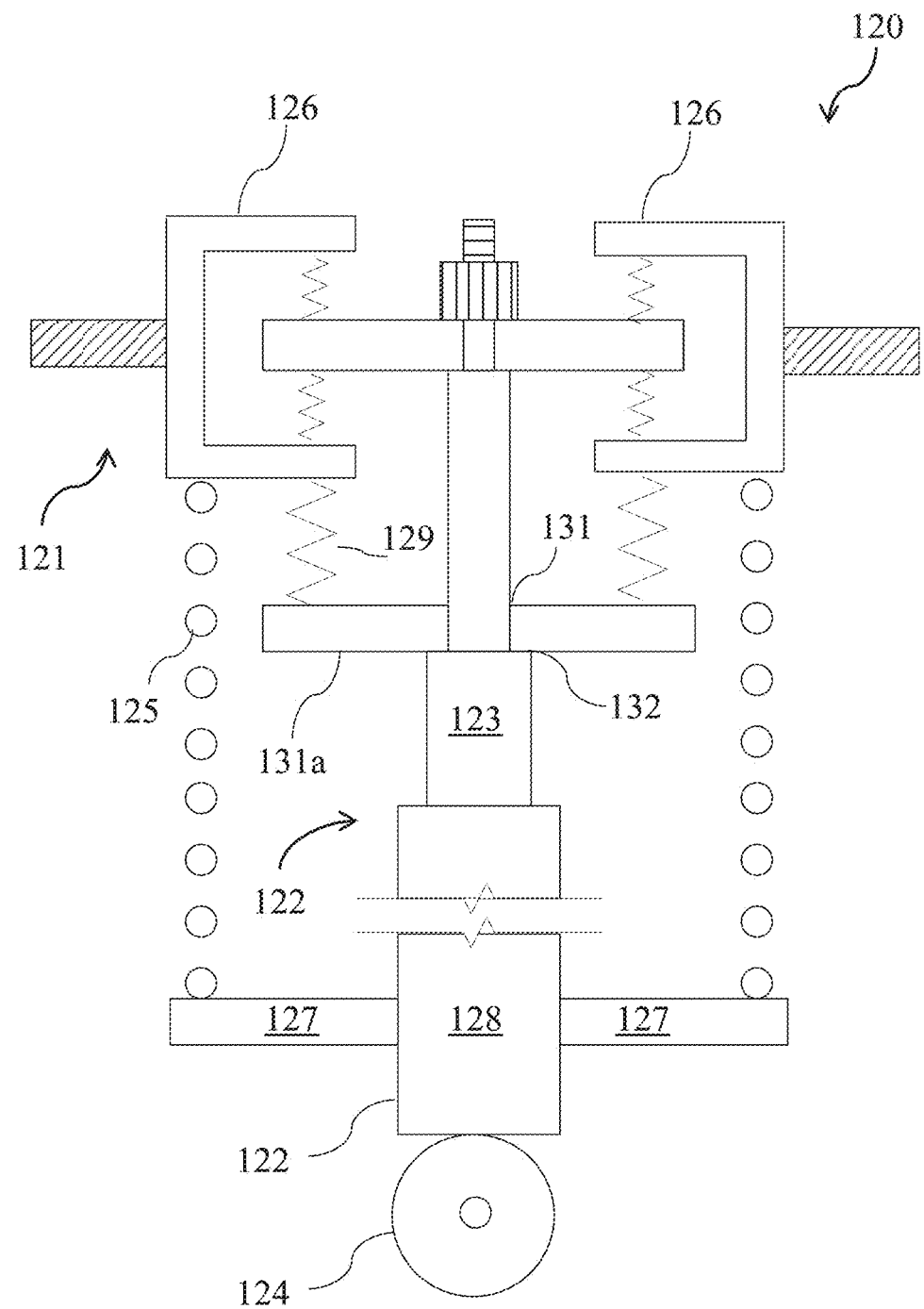
FIG. 12 is a schematic representation of an embodiment of a vehicle suspension assembly where a spring element located between the top-mount bracket and the piston rod is used to at least partially cancel the force applied by the piston rod under static conditions.

FIG. 12 illustrates an embodiment of a vehicle suspension assembly 120 with top-mount assembly 121. The damper 122 includes a piston (not shown) and piston rod 123. The damper 122 is interposed between a wheel assembly 124 of a vehicle (not shown) and top-mount assembly 121. In the embodiment in FIG. 12, a suspension coil spring 125 is interposed between the top-mount bracket 126 and a lower spring perch 127 that is fixedly attached to the damper housing 128. Spring element 129 is pre-stressed during the manufacture of the top-mount assembly 121 or when assembling the vehicle suspension assembly 120. Spring element 129 is interposed between the top-mount bracket 126 and disc shaped plate 131a. Plate 131a has a centrally located through hole 131 that receives the upper portion of piston rod 123. Plate 131a may be secured against annular radially extending shoulder 132 by the force in spring element 129. Alternatively or additionally, plate 131a may be fixedly attached to the piston rod 123 by, for example, welding and/or utilizing an interference fit between the inner diameter of through hole 131 and the outer diameter of the upper portion of piston rod 123. It is understood that shapes of the strike plate and the bracket other than those shown in FIG. 12 are contemplated as the disclosure is not so limited.

During manufacture and/or assembly, the spring element 129 may be compressed to produce a force that opposes, and at least partially cancels, the force applied by the piston rod on the top-mount assembly.

Figure 13:
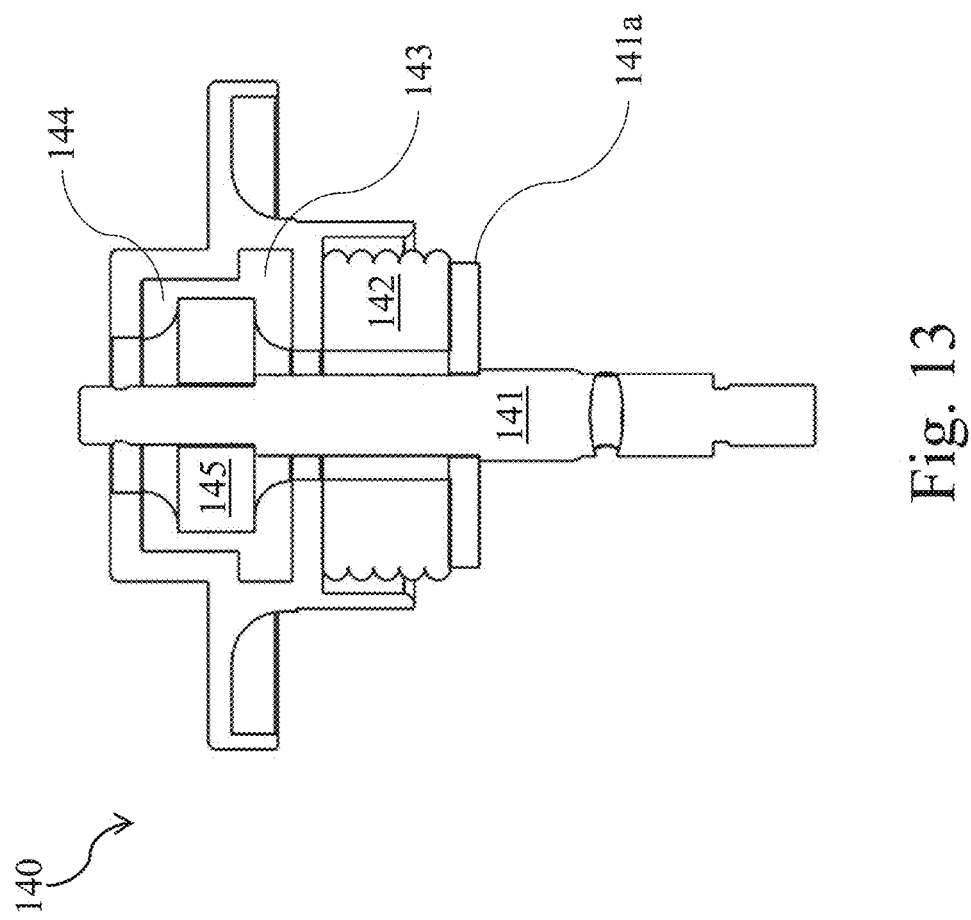
FIG. 13 is a partially sectioned CAD drawing of the embodiment shown in FIG. 12.
Figure 14:
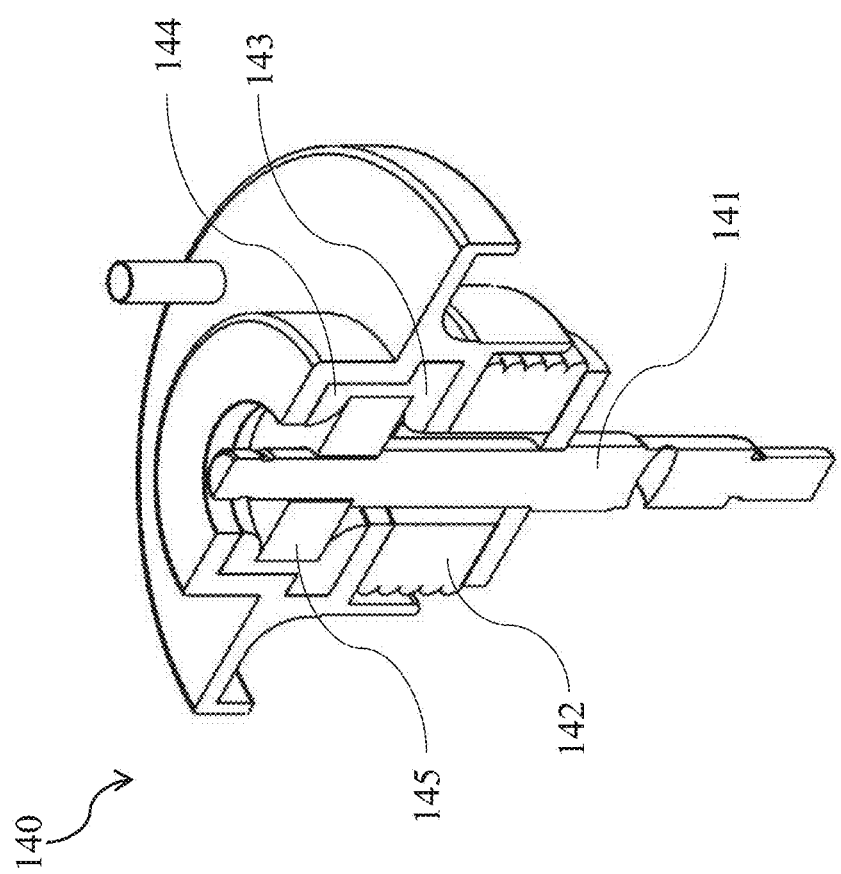
FIG. 14 is a partially sectioned perspective CAD drawing of the embodiment of FIG. 13.

FIG. 13 depicts one embodiment of a top-mount assembly and piston rod of the embodiment in FIG. 12. In FIG. 13, the top-mount assembly and the rod are positioned to be joined together. When the top-mount assembly 140 and piston rod 141 are joined together, at least spring element 143 and spring element 142 are stressed to apply opposite forces on strike plate 145. When the damper (not shown) is charged so that it applies a force on the piston rod in the upward direction, that force is at least partially balanced by the force applied by spring element 142 and spring element 143 is at least partially off-loaded. FIG. 14 illustrates a perspective section view of the top-mount assembly and piston rod shown in FIG. 13.

Figure 15:
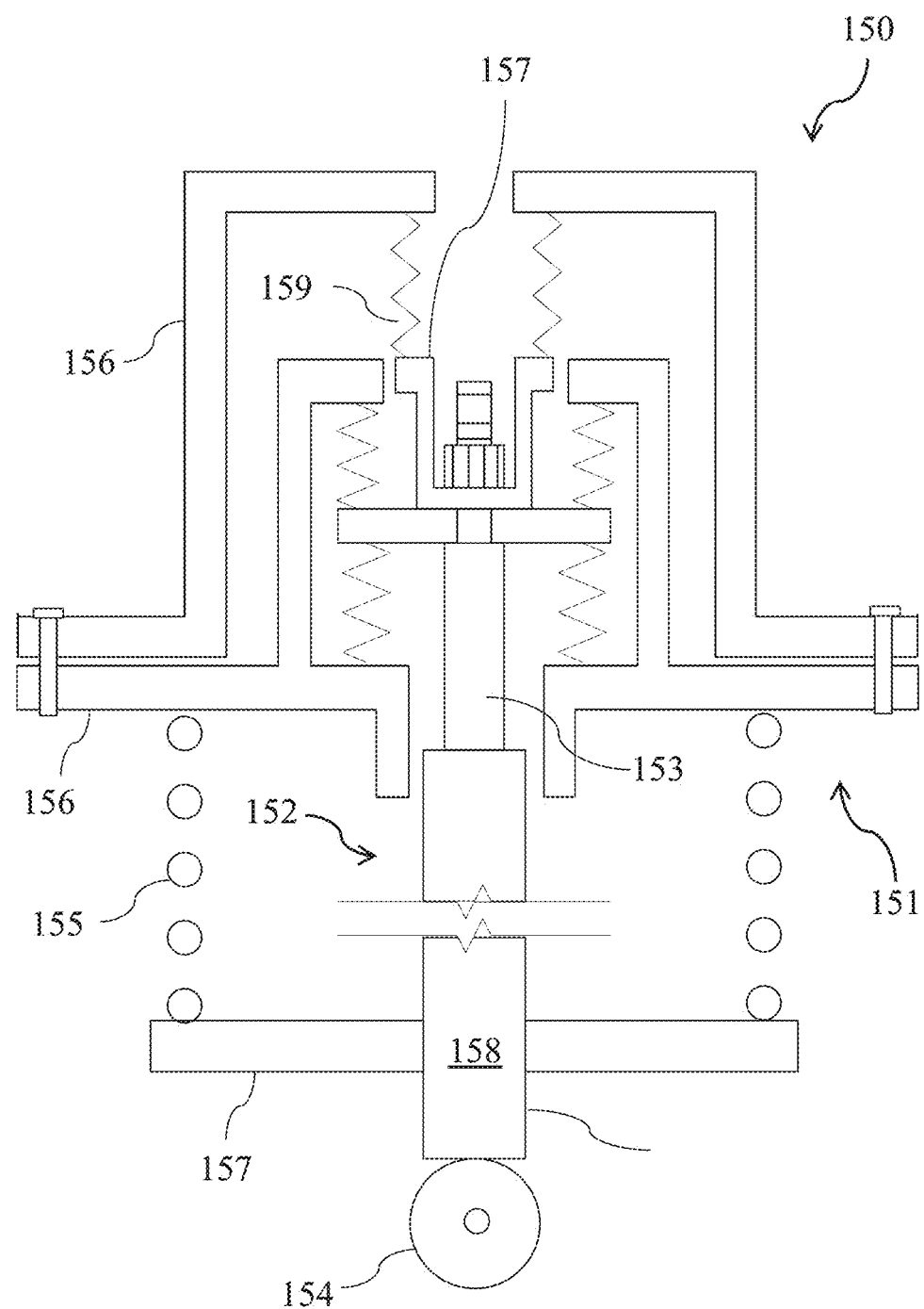
FIG. 15 is a schematic representation of another embodiment of a vehicle suspension assembly where a spring element located between the top-mount bracket and the piston rod is used to at least partially cancel the force applied by the piston rod under static conditions.

FIG. 15 illustrates another embodiment of a vehicle suspension assembly 150 with a top-mount assembly 151. The damper 152 includes a piston (not shown) and a rod 153. The top-mount assembly 151 includes a top-mount bracket 156 and a strike plate. The top-mount bracket may be configured to attach to a vehicle body and the strike plate may be configured to attach to the rod 153. The top mount bracket 156 includes an upper bracket portion and a lower bracket portion. The lower bracket portion may include an intermediate bracket member and a lower bracket member. In certain embodiments, the upper bracket portion may be an inverted cup. The strike plate may be located in a cavity at least partially defined by the lower bracket member and the intermediate bracket member. A first set of spring elements may include one or more lower spring elements interposed between a bottom face of the strike plate and the lower bracket member, and/or one or more intermediate spring elements interposed between a top face of the strike plate and the intermediate bracket member. In certain embodiments, the top mount assembly may include a second set of one or more spring elements. The second set of one or more spring elements may include one or more upper spring elements arranged such that each upper spring element is capable of applying a force onto the upper bracket portion and at least one of the strike plate and the rod. In certain embodiments, the top mount assembly 151 may include an anchor 157 that is physically attached to at least one of the strike plate and the piston rod. In certain embodiments, the second set of spring elements may include an upper spring element 159 that is interposed between the upper bracket portion and the anchor 157. In certain embodiments, the upper spring element may be arranged such that it is capable of applying a force onto the anchor.

The damper 152 may be interposed between a wheel assembly 154 of a vehicle (not shown) and top-mount assembly 151. In the embodiment in FIG. 15, a suspension coil spring 155 is interposed between the top-mount bracket 156 and a lower spring perch 157 that is fixedly attached to the damper housing 158. Upper spring element 159 may be pre-stressed during the manufacture or assembly of the top-mount assembly 151 and/or when assembling the vehicle suspension assembly 150.

During manufacture and/or assembly, the upper spring element 159 may be compressed to produce a force that opposes, and at least partially cancels, the force applied by the piston rod on the top-mount assembly under static conditions.

Figure 16:
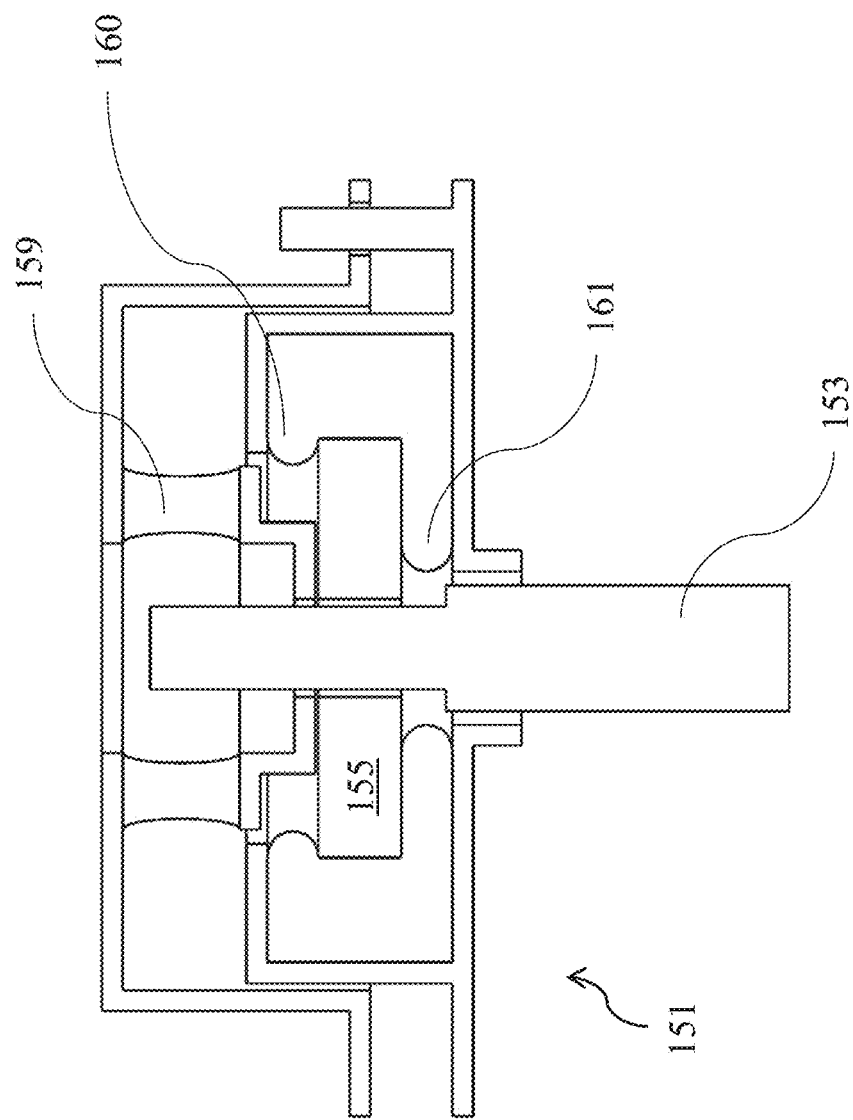
FIG. 16 is a partially sectioned CAD drawing of the embodiment shown in FIG. 15.

FIG. 16 depicts an embodiment of a top-mount assembly and piston rod described schematically in in FIG. 15. In the embodiment of FIG. 16, the top-mount assembly includes a bracket having an upper portion and a lower portion. The lower portion may include a lower bracket member and an intermediate bracket member, and the upper portion may include an upper bracket member. One or more intermediate spring elements 160 may be in contact with the intermediate bracket member and a strike plate 155. Additionally, one or more lower spring elements 161 may be in contact with the lower bracket member and the strike plate 155. One or more upper spring elements 159 may be in contact with the upper bracket member and an anchor that is attached to the strike plate 155. The anchor and strike plate may be arranged such that force applied by the one or more upper spring elements 159 onto the anchor may be transmitted to the strike plate 155.

Figure 17:
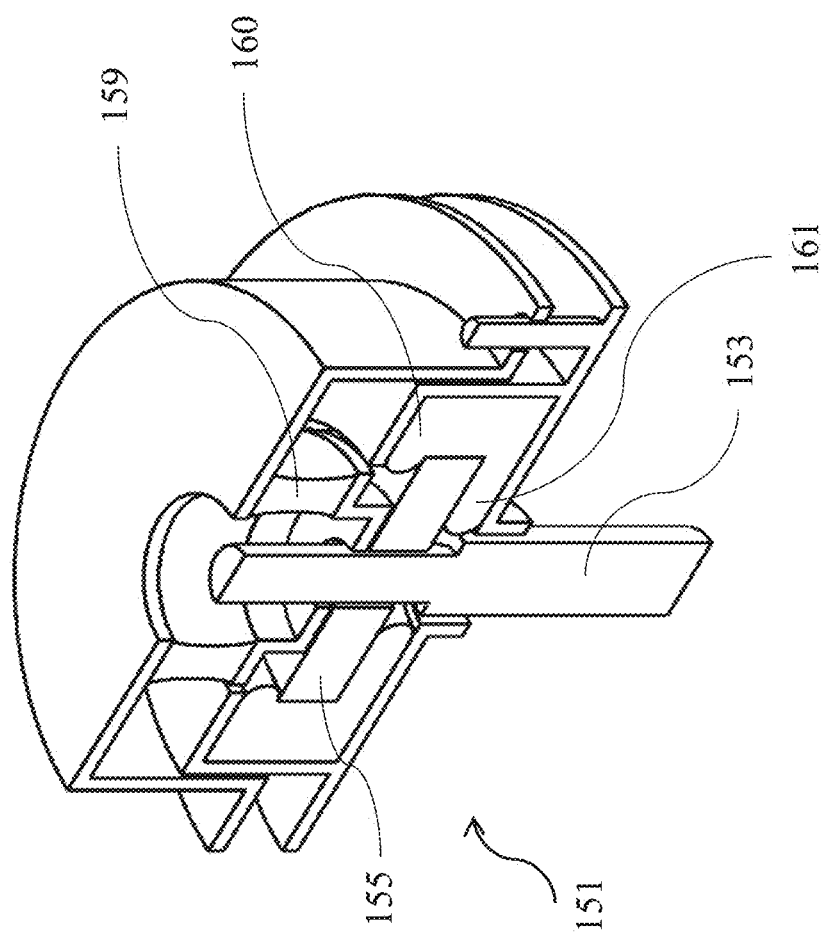
FIG. 17 is a partially sectioned perspective CAD drawing of the embodiment of FIG. 16.

FIG. 16 illustrates the top-mount assembly prior to attachment of the upper portion and the lower portion. Prior to such attachment, the one or more upper spring elements 159 are relatively unstressed (e.g., they apply a force having a magnitude not greater than a weight of the upper portion of the bracket). Following attachment of the upper portion to the lower portion, the one or more upper spring elements 159 may become compressed, such that the one or more upper spring elements 159 become relatively stressed (e.g., they may apply an upward force on the upper portion of the bracket and a downward force onto the anchor, each force having a magnitude that substantially exceeds the weight of the upper portion). When the damper (not shown) is charged, a piston rod 153 that is attached to the strike plate 155 may apply a static force onto the strike plate 155 in an upward or substantially upward direction. In certain embodiments, the length, spring constant, and/or compliance of the upper spring element 159 may be selected so that, under static conditions, the static force applied by the piston rod 153 is at least partially balanced by a downward or substantially downward force applied by upper spring element 159 onto the strike plate 155. FIG. 17 illustrates a perspective section view of the top-mount assembly and piston rod shown in FIG. 16.

Although the embodiments described above include a disc shaped strike plate, one of skill in the art will recognize that the present disclosure is not so limited and strike plates of any appropriate configuration can be used in alternative embodiments without departing from the concepts disclosed herein.

The invention claimed is:

1. A top-mount assembly for attaching a suspension component to a vehicle body, the top-mount assembly comprising:
   a top-mount bracket;
   a strike plate at least partially surrounded by the top mount bracket and configured to be attached to a piston rod of the suspension component; and
   a resilient material interposed between the top-mount bracket and the strike plate;
   wherein the resilient material has a stiffness that varies as a function of a position of the strike plate relative to the top-mount bracket,
   wherein the stiffness has a first value in a first range of positions of the strike plate relative to the top-mount bracket, a second value substantially greater than the first value in a second range of positions of the strike plate relative to the top-mount bracket, and a third value substantially greater than the first value in a third range of positions of the strike plate relative to the top-mount bracket;
   wherein application of a predetermined rod force to the strike plate causes the strike plate to be displaced from a first position to a second position relative to the top mount bracket, wherein the second position of the strike plate is more centrally located within the first range of positions than the first position of the strike plate.

2. The top mount assembly of 1, wherein the suspension component is selected from the group consisting of a passive damper, an active damper, a semi-active dampers, and a magnetorheological damper.

3. The top mount assembly of claim 2, wherein the predetermined rod force is a force applied by a piston rod of the suspension component under static conditions.

4. The top mount assembly of claim 1, wherein the resilient material is at least partially made of an elastomer.

5. The top mount assembly of claim 4, wherein the elastomer includes rubber.

6. The top mount assembly of claim 1, wherein resilient material is molded onto the strike plate.

7. The top mount assembly of claim 1, wherein the first value is less than 1000 newtons per millimeter and the second and third values are greater than 1000 newtons per millimeter.

8. The top mount assembly of claim 7, wherein the second and the third values are greater than 1000 newtons per millimeter.

9. The top mount assembly of claim 1, wherein the predetermined rod force is between 800 newtons and 900 newtons.

10. The top mount assembly of claim 1, wherein the first position is a neutral position of the strike plate.

11. The top mount assembly of claim 10, wherein when the strike plate is located at the neutral position, at least a portion of the resilient material is prestressed.

12. The actuator assembly of claim 1, wherein the static force is between 800 newtons and 900 newtons.

13. The actuator assembly of claim 1, wherein at the first position, movement of the strike plate relative to the bracket in one direction always results in a net force applied to the strike plate by the resilient material in a first direction and movement of the strike plate relative to the bracket in an opposite direction always produces a force in a second direction that is opposite the first direction.

14. An actuator assembly for a vehicle, the actuator assembly comprising:
   a hydraulic actuator that includes:
      a damper body;
      a rod protruding from the damper body;
   a top mount that includes:
      a strike plate that is affixed to the rod;
      a top-mount bracket at least partially surrounding the strike plate; and
      a resilient material interposed between the top-mount bracket and the strike plate;
      wherein the stiffness of the resilient material varies as a function of position of the strike plate relative to the top-mount bracket;
      wherein the stiffness of the resilient material has a first value in a first range of positions of the strike plate relative to the top-mount bracket, a second value substantially greater than the first value in a second range of positions of the strike plate relative to the top-mount bracket, and a third value substantially greater than the first value in a third range of positions of the strike plate relative to the top-mount bracket; and wherein, under static conditions of the hydraulic actuator, the piston rod transmits a static force to the strike plate that causes the strike plate to be displaced from a first position to a second position relative to the top mount bracket, wherein the second position of the strike plate is more centrally located within the first range of positions than the first position of the strike plate.

15. The actuator assembly of claim 14, wherein the resilient material is at least partially constructed of an elastomer.

16. The actuator assembly of claim 15, wherein the elastomer includes rubber.

17. The actuator assembly of claim 14, wherein the resilient material is molded onto the strike plate.

18. The actuator assembly of claim 14, wherein the first value is less than 1000 newtons per millimeter and the second and third values are greater than 1000 newtons per millimeter.

19. A method of assembling an actuator assembly in a vehicle, the method comprising:

attaching a piston rod of a hydraulic actuator to a strike plate of a top mount, wherein the hydraulic actuator is configured to apply a force to the strike plate;

wherein the top mount includes the strike plate, a top mount bracket, and a resilient material interposed between the top-mount bracket and the strike plate, wherein the stiffness of the resilient material has a first value in a first range of positions of the strike plate relative to the top-mount bracket, a second value substantially greater than the first value in a second range of positions of the strike plate relative to the top-mount bracket, and a third value substantially greater than the first value in a third range of positions of the strike plate relative to the top-mount bracket; and after attaching the piston rod and with the hydraulic actuator under static conditions, transmitting a static force from the piston rod to the strike plate, thereby displacing the strike plate from neutral first position relative to the top mount bracket to a second position relative to the top mount bracket, wherein the second position is more centrally located within the first range of positions than the first position of the strike plate.

* * * * *